June 26, 1928.

B. E. COLBURN

GROUND CLAMP

Filed Aug. 13, 1926

1,675,163

Inventor
Bearl E. Colburn
By
Attorneys

Patented June 26, 1928.

1,675,163

UNITED STATES PATENT OFFICE.

BEARL E. COLBURN, OF GREEN BAY, WISCONSIN, ASSIGNOR TO SUPER BALL ANTENNA CO., INC., OF GREEN BAY, WISCONSIN.

GROUND CLAMP.

Application filed August 13, 1926. Serial No. 128,945.

This invention relates to ground clamps.

Objects of this invention are to provide a novel form of ground clamp which may be attached to a pipe, or other object with which a ground connection is desired, and which is so constructed that a direct, positive and reliable contact is made with the pipe, or other member, under all conditions, irrespective of rust, accumulation of dust, or other foreign matter on the pipe.

Most specifically this invention has for its object the provision of a ground clamp, in which the attaching screw itself directly contacts with the pipe and is pointed and preferably hardened so that it will cut through the rust or scale on the pipe and bite into the metal of the pipe, and further to provide for a direct connection to the screw itself so that the current does not have to pass through the enclosing strap, but passes directly through the main screw into the pipe.

Further objects are to provide a novel form of clamp in which a hollow head is employed, such head serving in its normal capacity and cooperating with an adjustable strap, and in addition housing the nut and retaining the nut against rotation so that when the screw is turned there is the assurance that it will properly cooperate with the nut without requiring an additional instrument.

An embodiment of the invention is shown in the accompanying drawing, in which.

Figure 1:
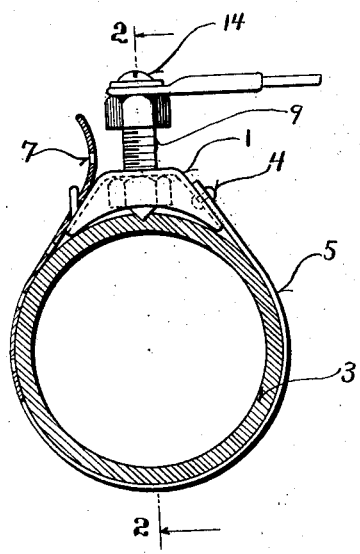
Figure 1 is a transverse, sectional view through the pipe and through a portion of the ground clamp.
Figure 2:
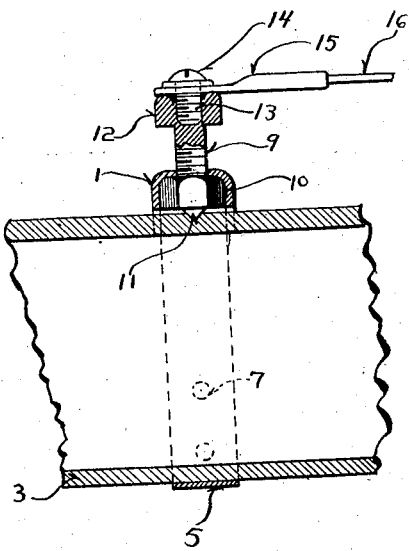
Figure 2 is a sectional view on the line 2—2 of Figure 1.
Figure 3:
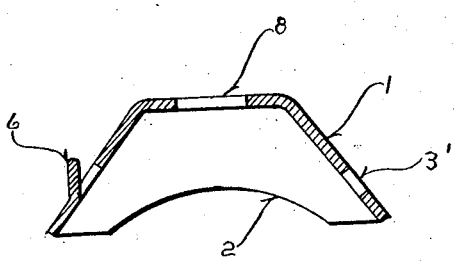
Figure 3 is a sectional view through the head, such view being drawn to an enlarged scale.

Referring to the drawings it will be seen that the ground clamp comprises a head 1, which, as may be seen particularly from Figures 2 and 3, is formed of sheet metal and stamped into a hollow box-like member having an open bottom and slanting sides. The straight sides are preferably provided with curved cut-outs 2 to conform to a pipe, or other member 3. In the description the term "pipe" will be used, although it is not intended in any sense as a limitation, but merely to avoid repetition. One of the slanting sides is provided with an aperture 3' adapted to receive a rivet 4 of the encircling strap or band 5. The other slanting side is provided with an outwardly turned tongue 6 which fits into one of a plurality of apertures 7 formed in the band so that a rough attachment to the pipe may be secured. The top of the head is provided with an aperture 8 through which a screw 9 passes. It is to be noted that this screw is threaded through a nut 10 which is received in the hollow body of the head, as shown in Figures 1 and 2, and is prevented from turning by fitting between the sides of the head. The screw 9 is pointed, as indicated at 11 and is preferably hardened so as to permit the biting of the point of the screw into the pipe through any rust or coating that may be on the pipe to thus insure a positive contact directly from the screw to the pipe. This screw is provided with a wrench receiving head 12 so that it may be readily forced into position.

The upper end of the screw is hollow and tapped, as indicated at 13, and receives the internal attaching screw 14. This attaching screw is passed through the eyelet 15 of the wire 16 and thus directly attaches the wire to the screw, the screw itself being directly in contact with the pipe.

In this manner it is not necessary for the current to pass through the strap to the pipe, but instead the current passes directly through the screw to the pipe, such screw insuring, as stated above, a metal to metal contact with the pipe.

Although the invention has been described in considerable detail, such description is intended as illustrative rather than limiting, as the invention may be variously embodied and as the scope of such invention is to be determined as claimed.

I claim:

A ground clamp comprising a hollow inverted cup-shaped head formed of stamped sheet metal, said head having side portions cut away along a curved edge to form a recessed bottom edge adapted to contact with the pipe and an encircling strap secured at one end to said head and adapted to extend around the pipe and having a plurality of apertures in the other end thereof, said head having an outwardly turned tongue adapted to be passed through any one of said apertures, a nut fitted within said head and held against turning by said head, a screw provided with a pointed end adapted to bite into said pipe when said screw is threaded through said nut, said screw having a wrench receiving outer end provided with a tapped hole, and a terminal attaching screw threaded into said hole.

In testimony that I claim the foregoing I have hereunto set my hand at Green Bay, in the county of Brown and State of Wisconsin.

BEARL E. COLBURN.